United States Patent [19]
Strapp

[11] 3,721,952
[45] March 20, 1973

[54] HOMING SYSTEM FOR THE ACQUISITION OF A SEA-GOING TARGET VEHICLE BY DETECTION OF ITS WAKE

[76] Inventor: Joseph P. Strapp, 1840 Deserta Drive, Glendora, Calif. 91740

[22] Filed: April 29, 1971

[21] Appl. No.: 138,538

[52] U.S. Cl. .................... 340/4 R, 114/23, 340/5 R
[51] Int. Cl. ............................................. F42b 19/01
[58] Field of Search ....... 340/4 R, 5 R; 114/21 A, 23

[56] References Cited

UNITED STATES PATENTS

| | | |
|---|---|---|
| 2,409,632 | 10/1946 | King .................................... 114/23 |
| 3,267,418 | 8/1966 | Wolfe .................................. 340/4 R |

Primary Examiner—Richard A. Farley
Attorney—Richard S. Sciascia, Ervin F. Johnston and John Stan

[57] ABSTRACT

An underwater missile homing system, comprising: two pairs of test thermocouple (TC) junctions, means for mounting one pair of TC junctions on the missile so that they extend laterally therefrom in opposite directions, and means for mounting the other pair of TC junstions on the missile so that they extend vertically therefrom in opposite directions. Guidance means are provided on the missile for guiding the missile in a horizontal direction and in a vertical direction. Means are also provided responsive to signals obtained from the TC junctions for controlling the guidance means, whereby said missile will home in on a sea-going vehicle, in azimuth and elevation, which emits heat in its wake.

9 Claims, 3 Drawing Figures

HOMING SYSTEM FOR THE ACQUISITION OF A SEA-GOING VESSEL.

WAKE-DETECTING APPARATUS WITH RESISTIVE NETWORK TO ADJUST REFERENCE LEVEL.

INVENTOR.
JOSEPH P. STRAPP,
By
ERVIN F. JOHNSTON,
ATTORNEY.
JOHN STAN,
AGENT.

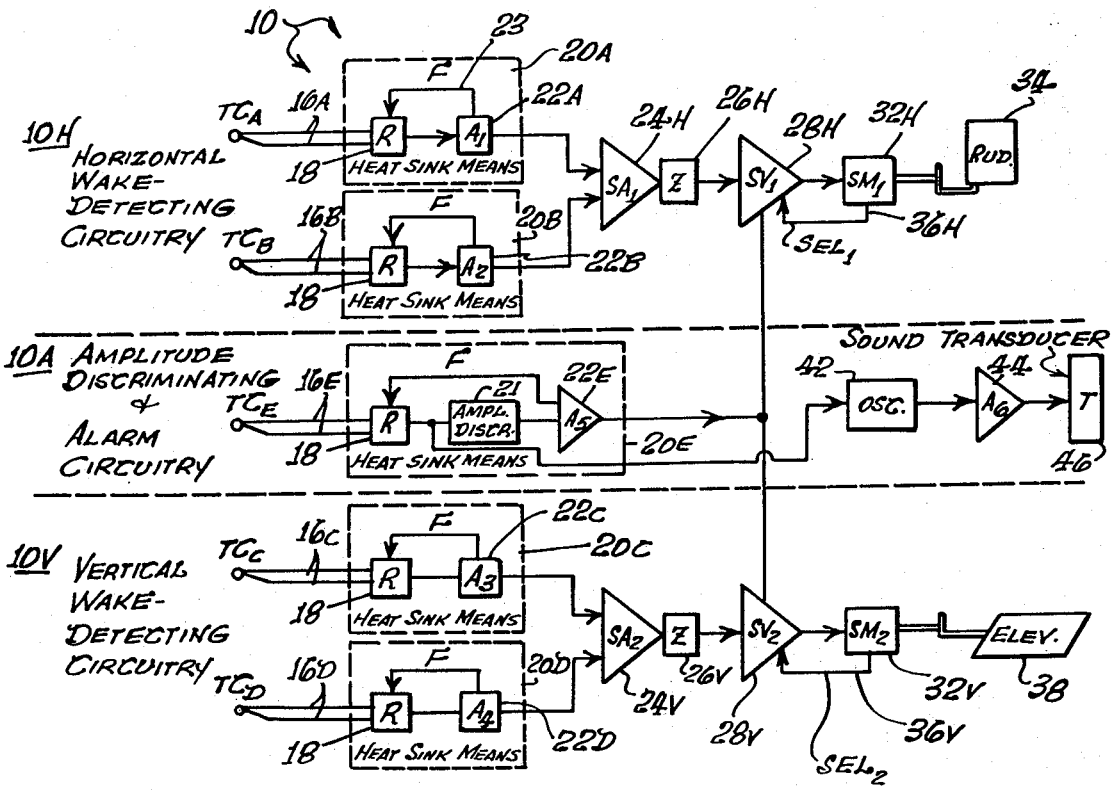

- $TC_A$ = STARBOARD THERMOCOUPLE JUNCTION
- $TC_B$ = PORT THERMOCOUPLE JUNCTION.
- $TC_C$ = TOP THERMOCOUPLE JUNCTION.
- $TC_D$ = BOTTOM THERMOCOUPLE JUNCTION.
- $TC_E$ = FORWARD THERMOCOUPLE JUNCTION.
- R = THERMOCOUPLE REFERENCE JUNCTION.
- F = THERMOCOUPLE FEEDBACK LOOP.
- $A_1, A_2, A_3, A_4, A_5, A_6$ = THERMOCOUPLE AMPLIFIERS. HI-GAIN, HI-IMPEDANCE DELAYED OUTPUT ON $A_1, A_2, A_3, A_4$.
- $SA_1$ & $SA_2$ = SUMMING AMPLIFIERS.
- $SV_1$ & $SV_2$ = SERVO AMPLIFIERS.
- $SM_1$ & $SM_2$ = SERVO MOTORS.
- $SEL_1$ & $SEL_2$ = SERVO ERROR LOOP
- Z = FLIP-FLOP AMPLIFIER SELECTOR.
- O = OSCILLATOR
- T = SOUND SIGNAL TRANSDUCER.

FIG. 2.

COMPLETE THERMOCOUPLE CIRCUITRY FOR THE HOMING SYSTEM.

HOMING SYSTEM FOR THE ACQUISITION OF A SEA-GOING TARGET VEHICLE BY DETECTION OF ITS WAKE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a homing system on a missile, using two pairs of thermocouple junctions, a horizontal pair and a vertical pair, both pairs mounted on extensions on the missile, to detect the target vessel in azimuth and elevation, by trailing its wake. Generally, the missile will follow a three-dimensional "S" path.

There are several types of homing devices used in the prior art to detect the presence of a wake. Sonar pinging has been used, but it is subject to error due to temperature gradients, and the attendant cumbersome and complicated electronic equipment is costly. Infrared detection is limited by water attenuation and complex equipment. Pressure transducers of the piezoelectric type have been used, with amplifiers, to detect the presence of a wake.

The thermocouple target-seeking method is simple and reliable. It is inexpensive and not materially effected by depth, pressure, or corrosion due to sea and weather.

SUMMARY OF THE INVENTION

A pair of test thermocouples extending out on rods, or extensions, one on the port side and one on the starboard side of an underwater missile, and another pair extending above and below the missile can detect the wake of an underwater vehicle at any depth. The wake causes turbulence and heat exchange in the water which the thermocouples can detect. The test thermocouples are referenced to compensating thermocouple (TC) junctions operated by a small voltage source inside the missile, and a DC amplifier, servo amplifier and servo motor can then drive an elevator or rudder to guide the missile along the wake to its target. As the first thermocouple cuts into the wake, the heated thermocouple generates an operating voltage, which when amplified can actuate a delay mechanism, and when the second thermocouple cuts the wake and becomes warmer than the first, the servo system actuates a rudder to turn the missile away from its original direction. After the missile cuts back through the wake, the first thermocouple through its system causes the rudder to reverse its position. The missile will follow a three-dimensional figure "S" course to stay in the path of the wake. The vertical thermocouples act in the same manner to control the elevator on the missile in the pitch mode. A depth operating switch can be used to make the system "go", or mute for any depth. To prevent interference from surface heat gradients, use of a timing and switching circuit can effect a change of direction of 180°, and a new search pattern begun if need be, when the signal is lost or weak.

The thermocouples can detect water turbulence (in the wake) up to an hour after an underwater vehicle has passed by.

OBJECTS OF THE INVENTION

One object of the invention is to provide a homing system which can detect and follow the wake of a seagoing vessel regardless of the complexity of the path of the wake.

Another object of the invention is to provide a homing system which is not affected by depth, pressure or corrosion.

Yet another object of the invention is to provide a homing system which is capable of initiating a second search for the target if the first search was unsuccessful.

Other objects, advantages and novel features of the invention will become apparent from the following detailed description of the invention, when considered in conjunction with the accompanying drawings, wherein:

BRIEF DESCRIPTION OF THE DRAWINGS

FIG. 2 is a schematic diagram of the complete electronic circuitry for the homing system.

DESCRIPTION OF THE PREFERRED EMBODIMENTS

Figure 1:
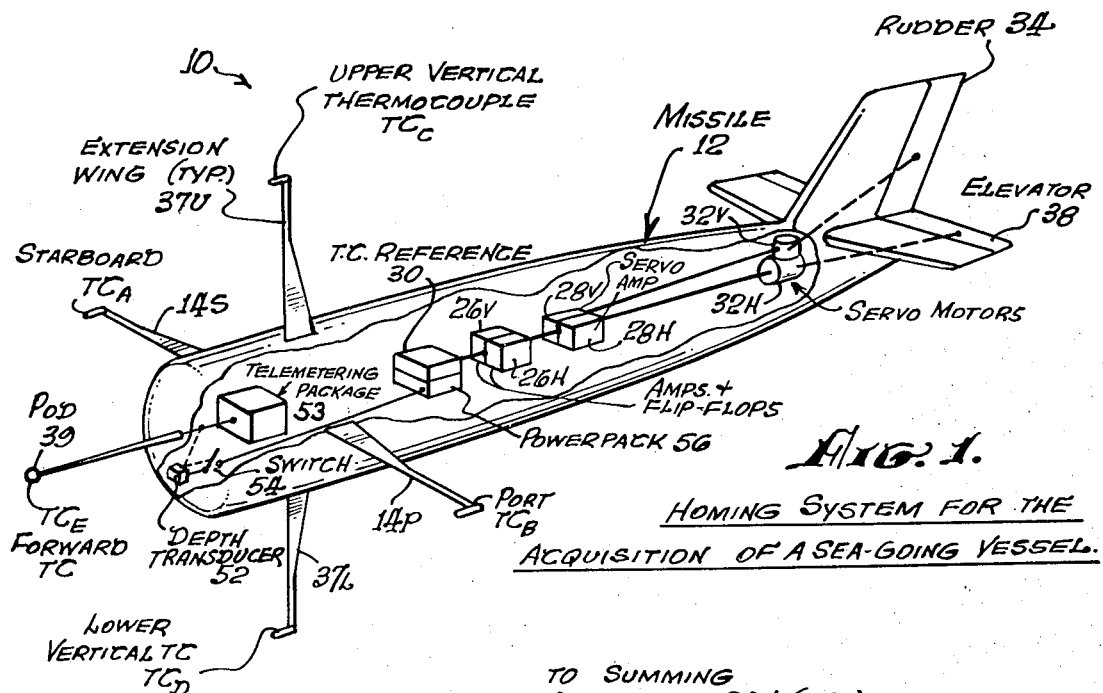
FIG. 1 is a diagrammatic view of the complete detection and guidance system for the acquisition of a seagoing vehicle, including the position of the main elements in the missile.

The invention can best be described by referring jointly to FIGS. 1 and 2. FIG. 1 shows the mechanical, physical, placement of the important components of the homing system 10, including the missile 12 itself, whereas FIG. 2 is a schematic diagram showing the circuitry associated with the homing system.

Also, as the homing system 10 can be used to detect the wake of a surface vessel, wherein those elements of the homing system involved in the detection of the vertical components of the wake would not be used, it will first be described using only those elements involved in the detection of the horizontal components of the wake of the surface vessel.

Referring now to FIGS. 1 and 2, these figures show a detection and guidance, or homing system 10, to be used on a self-propelled missile 12, for the acquisition of a seagoing target vehicle (not shown) by detection of its wake. Describing first the horizontal wake detection circuitry 10H (FIG. 2), the missile 12 has two extensions, one on each side of the missile axis, a port horizontal extension 14P and a starboard horizontal extension 14S, which are submerged below the surface of the water when the missile is in motion. One test TC junction, $TC_B$ or $TC_A$, is mounted at the end of each extension, 14P and 14S, respectively, a pair of TC conductors, 16A and 16B, generally shielded, extending from each test TC junction, with the voltage generated by a test junction increasing significantly when the test junction intercepts the wake of a seagoing vehicle. Thermopiles, consisting of a series of thermocouples, can be used instead of a single thermocouple to increase sensitivity.

The horizontal extensions, 14P and 14S, have a length such that the two horizontal thermocouple junctions, $TC_A$ and $TC_B$, are in the range of 12 to 15 feet apart.

The vertical thermocouple junctions, $TC_C$ and $TC_D$, which are a part of the vertical wake-detecting circuitry 10V(FIG. 2), are separated by a distance having the same order of magnitude.

Referring now to FIG. 2, the free ends of each pair of conductors, 16A and 16B, enter heat sink means, 20A and 20B, respectively, for establishing reference junctions 18. The heat sink means 20A and 20B includes a pair of voltage amplifiers, 22A and 22B, the input of each amplifier being connected to a pair of free ends of the conductors leaving the reference junction 18. The output voltage of each amplifier, 22A and 22B, has a time delay with respect to its input, so that it generates an output voltage for a short interval of time after the TC junction, $TC_A$ or $TC_B$, with which it is associated has passed beyond the intercepted wake of a target vehicle.

The purpose of the delay in the output of the amplifiers, 22A and 22B, is to permit both thermocouples, $TC_A$ and $TC_B$, of the missile 12 to cross the wake before the motion of the rudder 34 causes the missile to make a turn, generally a sharp turn, for example, of approximately 110°, in the opposite direction, to again cause first one and then the other of the thermocouples to detect and cross the wake of the target vehicle.

Discussing now in more detail a possible search mode of the homing system 10 on the missile 12, let it be assumed that the starboard thermocouple $TC_A$ first detects a wake, causing the generation of a TC signal which persists until after thermocouple $TC_A$ has passed out of the wake. The port thermocouple $TC_B$ then crosses the wake, and it also generates a signal in its related amplifier 22B which overrides the signal in amplifier 22A, and which persists until after the thermocouple $TC_B$ has passed out of the path of the wake, also.

After both thermocouples, $TC_A$ and $TC_B$, have passed out of the path of the wake, and after a predetermined amount of delay, of approximately 1 second, circuitry, described in more detail hereinbelow, is triggered which causes a change, or approximately 115°, in the position of the rudder 34, or elevator 38, and causes the missile 12 to cross the wake in the opposite direction.

Under unusual conditions, the second of the two thermocouples, $TC_B$ in the instance just described, may not pass out of the path of the wake for an unusually long interval of time, for example, 3 seconds. There may therefore be built into the homing system 10 a system for reversing the motion of the missile 12 after a predetermined interval of time after the second thermocouple $TC_B$ has entered the path of the wake, irespective of the fact that it has not actually passed out of the path of the wake within this interval of time.

Referring again to the circuitry shown in FIG. 2, a summing amplifier 24H has as its two inputs the output voltages from the pair of voltage amplifiers, 22A and 22B, and has an output voltage at one of two levels, depending on which of the two junctions, $TC_A$ or $TC_B$, has first intercepted the wake of the target vehicle.

The summing amplifier 24 takes the differential between the output voltages generated by the pair of thermocouples, such as the horizontal pair, $TC_A$ and $TC_B$, and can distinguish between the situation when the port thermocouple $TC_B$ first cuts across the wake of an enemy target vehicle and the other situation when the starboard thermocouple $TC_A$ first cuts across a wake. Which of the two situations occurs determines whether the output voltage of the summing amplifier 24 is at a high level or at a lower level, and, since the output voltage appears at the input of the flip-flop 26, it therefore determines which of two voltage polarities appears at the output of the flip-flop.

With the usual values of direct-current plate supply and grid voltages used in flip-flop circuits, in one state the plate output voltage of either tube is at one level, and in the other state the plate output voltage of the same tube is at another, significantly different, level. Ordinarily, the two plate output voltage levels are of the same polarity. However, as is well known to one skilled in the art, inasmuch as the voltage reference level in any electronic circuit can be set at any of various levels, intermediate between the most positive and most negative points in the flip-flop circuit, if the reference level of the flip-flop circuit be set at least approximately half way between the two different output voltage levels which are attained with a zero reference level, then in one state the plate output voltage of either tube will be of one polarity, and in the other state the plate output voltage of the same tube will be of the other polarity.

A servo amplifier 28 has its input connected to the output of the flip-flop 26. A servo drive motor 32 has its input connected to the output of the servo amplifier 28 and its output adapted for connection to a tilting device, such as a rudder 34, in the horizontal system. The direction in which the servo motor 32 rotates depends on the polarity of its input voltage. Generally, a feedback loop 36, connected from the output of the servo motor 32 to the servo amplifier 28, while not absolutely essential, is used to improve the stability and response of the servo system.

Vertical wake-detecting circuitry 10V, connected to thermocouples $TC_C$ and $TC_D$, which are mounted on upper and lower extensions, 37U and 37L, respectively, and having elements which correspond to similar elements in the horizontal wake-detecting circuitry 10H, control an elevator 38, the controlled movement of which enables the homing system 10 to track the wake of a target vehicle in the vertical direction.

When a wake is first crossed, it is not known in which of the two directions of the wake the target vehicle is located, that is to say, the homing missile initially does not "know" if it is going toward the target or away from it.

To eliminate this uncertainty, there must be included in the homing system 10 a subsystem which monitors the amplitude of the detected TC signals, and can discriminate between the situation when the detected TC signals are decreasing in amplitude and the desirable situation when the detected TC signals are increasing in amplitude.

To provide this discrimination is the function of the amplitude-discriminating and alarm circuitry 10A. Actually, as its title implies, this circuitry 10A has two functions, each of which will be described in turn.

A forward thermocouple $TC_E$, which is located on a forward pod 39 on the nose of the missile 12 would usually be the first of the thermocouples to detect the presence of a wake. One function of the forward thermocouple $TC_E$ is to trigger circuitry when the wake is first entered, that is to say, it sets up the other circuitry.

The detected signal is then conducted by leads 16E (FIG. 2) to a reference junction 18, which forms a part of the heat sink means 20E. The TC signal then enters an amplitude-discriminator 21. This is a circuit 21 which may, for example, comprise a chopper which chops the input signal into pulses, stores the peak values of the pulses, and is able to integrate, or average, a number of these pulses and then compute whether the average is increasing or decreasing.

If the detected TC signal gets weaker and weaker, then the homing system 10 causes a reversal of approximately 190° in the direction of the missile 12, and the homing system starts another search. Since the TC signals would keep increasing in strength this time, the homing system 10 would lock onto the target.

A constantly decreasing signal at the output of the amplitude discriminator 21 will cause an output signal from amplifier 22E which overrides the signal in servo amplifiers 28H and 28V and causes a reversal in the direction of rotation of the servo drive motor 32H and 32V, which causes a change in the position of the tilting device, rudder 34 or elevator 38.

The missile 12, which may be a torpedo, can be made to reverse its direction, after having crossed the wake, by any convenient angle greater than approximately 90°, but an angle of 115° would be sufficient under any but very extreme conditions.

Under ideal conditions all five thermocouples, $TC_A$, $TC_B$, $TC_C$, $TC_D$ and $TC_E$, could be locked onto the target. This could happen in the fortuitous case of the missile 12 being launched so that its direction of motion just happens to coincide with the exact direction of the wake of the vehicle. However, since the path of the wake would never continue in a straight line for any great distance, and all parts of the wake are not at identically the same temperature anyway, all five thermocouples would not be locked onto the target for any considerable length of time, and the homing system would shortly resume its criss-crossing of the wake, due to first one and then the other of each of the two pairs of thermocouples crossing the path of the wake.

The missile 12 may have an acoustic alarm system 10A associated with it. The alarm system may include a "squawker," shown as transducer 46, which generates an omnidirectional acoustic signal, which may be a pinging type signal, which may be detected by the hydrophones of surface vessels, which then can help locate the enemy vessel. The hydrophones on the friendly vessels can pick up this acoustic signal emitted by the missile 12 and can, therefore, determine the direction in which the enemy submarine is situated. The signal emitted by the acoustic signal source on the missile, after the thermocouples have detected the presence of a wake, may be a 1 kc note, for example, generated by acoustic oscillator 42.

This 1kc signal, emitted by transducer 46, after amplification by amplifier 44, may be picked up by the sound gear of any vessel in the area. The searching apparatus on the surface vessel is then directed to keeping track of the missile.

The alarm system could also serve the purpose of alerting a friendly vessel when it is too close to the path of the homing missile. The pinging signal could be an IFF type signal warning friendly vessels to stay out of the area, or at least out of the path of the missile 12.

For determining the depth, the homing system 10 may have associated with it a depth transducer 52 (FIG. 1) connected to a recording system, which may be considered part of the telemetry system 53, so that, if the missile 12 had been unable to locate the target, and the missile were later salvaged, a record of the missile's trajectory in depth would be available.

The acoustic signal may be coded so as to give a continuous indication to the launching vessel of the depth at which it is operating. In fact, a more sophisticated telemetering system 53 could monitor the complete trajectory in depth and azimuth of the missile's path.

A depth operating switch 54 (FIG. 1), connected to the depth transducer 52, may be used to make the homing system 10 "go", or be operative, or which can mute the system, that is, make it inoperative, for any depth. The muting would be done if there were turbulence at any particular depth not due to the presence of a wake. For example, there is turbulence near the surface of the ocean due to the action of the waves, and often there is turbulence at the bottom of the ocean. The depth operating switch 54 would also help the missile 12 to avoid homing in on a thermal gradient.

The depth operating switch 54 may be set so that the missile 12 will not start or continue seeking a target which is less than, for example, 25 ft below the surface of the ocean or more than a certain depth, such as 2,000 ft. When the missile 12 starts to search for a target in such a forbidden region, the depth operating switch 54 triggers circuitry which causes the missile to change its path, if the homing circuitry 10 had been seeking a target just before going into a forbidden region. However, if the missile 12 had just been launched, the depth operating switch 54 will not activate the homing circuitry until the missile reaches a depth of at least 25 ft. It could do this, for example, by deenergizing that part of the power supply 56 which supplies energy to the homing system 10.

Depth-governing switches are used presently on water-borne missiles. All that is required is a pressure switch which activates a circuit when the pressure of the water exceeds a certain amount, for example that which is equivalent to a depth of 25 ft, and cuts out, or deenergizes the same circuit when the pressure exceeds a predetermined amount, for example the pressure present at a depth of 2,000 ft.

If circuitry associated with the depth-operating switch 54 determines that the missile is operating in a forbidden region with respect to depth, it can be made to activate circuitry which will cause the missile to move 90°, or more, from the previous direction, so that the missile may start searching in a new direction.

Describing now heat sink means, since the temperature of the ocean in any given area is more or less constant, a refrigerated heat sink may not be necessary under some conditions. All that would be necessary is that the heat sink be cooled by the ocean water it is passing through. However, in general, a heat sink refrigerated to, say, the temperature of melting ice would be used. Better yet, of course, would be to use the electronic heat sink described hereinbelow.

A miniature refrigerator thermostatically controlled may also be used as a heat sink.

Figure 3:
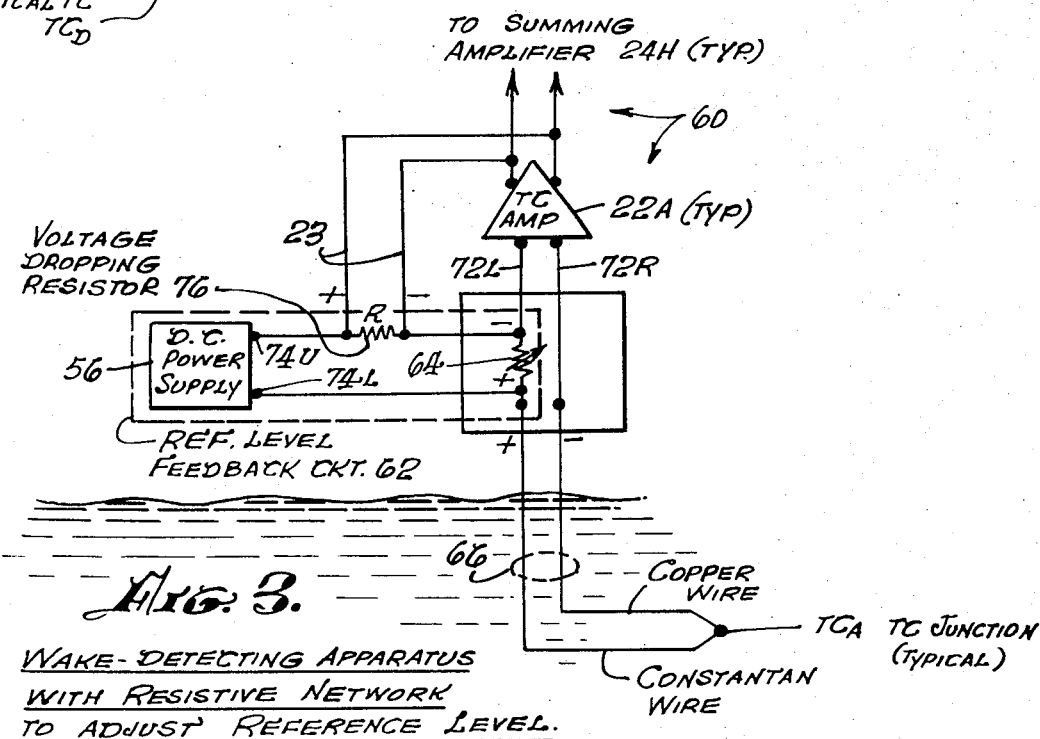
FIG. 3 is a schematic diagram of the wake-detecting circuitry associated with each thermocouple, including the electronic heat sink for the reference junction.

FIG. 3 shows an embodiment 60 wherein the heat sink means comprises electronic circuitry, not requiring the conventional refrigerated bath. Effectively, an electronic heat sink is used, with feedback leads 23 connected from the output leads of the TC amplifier 22A to a reference level feedback circuit 62.

The electronic circuitry comprising the reference level feedback circuit 62 includes a DC power supply 56, for example a battery power supply, and a potentiometer 64, connected in series by one end, a first end, with one of the conductors 66, the constantan wire, which is connected to the test TC junction $TC_A$, and by the other end to one of the input leads 72L to the TC amplifier 22A, the first end also being connected to one of the terminals, the lower one 74L, of the power supply. A voltage-dropping resistor 76 has one of its ends connected to the other, upper, terminal 74U of the power supply 56, and the other end connected to the junction of the potentiometer 64 and the input lead 72L to the TC amplifier 22A, the output voltage of the TC amplifier also being developed across the resistor 76.

The polarity of the DC power supply 56 and the connection of the potentiometer 64 to one of the test TC conductors 66 is such that the voltage developed across the potentiometer by the test TC junction $TC_A$ in an environment where no wake is present is exactly neutralized, in magnitude and polarity, by the voltage developed by the DC power supply 56 across the potentiometer.

Thereafter, the feedback circuit 62 is fed back a voltage from the output of the TC amplifier 22A, by means of leads 23, which maintains the input to the summing amplifier 24H at the zero reference level until the test TC junction $TC_A$ intercepts a wake, even if the static temperature undergoes a slow variation not due to the presence of a wake.

The advantage of the electronic heat sink is that no warm-up time is required, whereas, with an ice bath it takes time for the ice to melt, and with a small refrigerator, it takes time for the thermostat to stabilize.

Having once set the electronic heat sink to a given temperature, say 30°, the heat sink will maintain the reference junction at this temperature even though the ambient temperature of the water vary over a considerable range, in different regions of the ocean.

Possible alternative embodiments will be briefly described.

The extension wings supporting the thermocouples can be folded back against the missile body and released for search. The forward thermocouple $TC_E$ can trigger this action.

The forward thermocouple $TC_E$ can be used as a reference junction instead of the reference junction package.

Streamline pods on the four wingtips protect the thermocouples from reacting to the forward motion of the missile in the water.

Using the implementation as described hereinabove, the wake of a submarine going 10 knots has been detected at sea off the coast of California 45 minutes after the submarine had passed. By that time, the sub was over 7 miles away from the towing vessel. The depth of search was 300 ft, where the water temperature was 34°F and a differential temperature of 1/400°F was discernible. It would be possible to plot a pattern of the wake and use the trolling vessel to trace or extrapolate the wake to its source. Also, instead of a trolling vessel a helicopter could carry the small amount of equipment needed to record the trend of the wake. A submarine may also be used to detect and track an unfriendly submarine.

Obviously many modifications and variations of the present invention are possible in the light of the above teachings. It is therefore to be understood that within the scope of the appended claims the invention may be practiced otherwise than as specifically described.

What is claimed is:

1. An underwater missile homing system, comprising: two pairs of test thermocouple (TC) junctions;
    means for mounting one pair of test TC junctions on the missile so that they extend laterally therefrom in opposite directions;
    means for mounting the other pair of test TC junctions on the missile so that they extend vertically therefrom in opposite directions;
    guidance means on the missile for guiding the missile in a horizontal plane and in a vertical plane; and
    means responsive to signals obtained from the test TC junctions for controlling the guidance means,
    whereby said missile will home in on a sea-going vehicle which emits heat in its wake.

2. A detection and guidance, or homing, system to be used on a self-propelled missile, for the acquisition of a seagoing target vehicle by detection of its wake, comprising:
    a pair of extensions, one mounted on each side of the missile axis, which are submerged below the surface of the water when the missile is in motion;
    a pair of test thermocouple (TC) junctions, one test TC junction mounted at the end of each extension, a pair of TC conductors extending from each test TC junction, with the voltage generated by a test junction increasing significantly when the test junction intercepts the wake of a seagoing vessel;
    heat sink means connected to the free ends of each TC conductor for establishing reference junctions;
    a pair of TC voltage amplifiers, the input of each amplifier being connected to a pair of conductors connected to a reference junction, the output voltage of each amplifier having a time delay with respect to its input, so that it generates an output voltage for a short interval of time after the test TC junction with which it is associated has passed beyond an intercepted wake;
    a summing amplifier, whose inputs are the output voltages from the pair of voltage amplifiers, and whose output voltage is at one of two levels, depending upon which of the two junctions has first intercepted the wake of the target vehicle;
    a flip-flop, whose input is the output voltage from the summing amplifier, and which has an output voltage whose polarity depends on the output voltage level of the summing amplifier;
    a servo motor, which is capable of rotating in either direction depending on the polarity of its input voltage, whose input is the output of the flip-flop; and whose output is adapted for connection to a tilting device, to thereby tilt it in the desired direction.

3. The homing system according to claim 2, further comprising:

a servo amplifier connected between the output of the flip-flop and and the input of the servo motor, for amplifying the input voltage from the flip-flop.

4. The homing system according to claim 3, wherein the two extensions comprise a port and starboard extension; and wherein the tilting device is a rudder mounted on the missile, for steering the missile;

the homing system thereby being effective in detecting and homing in on a seagoing target, leaving a substantially horizontal wake, such as a surface vehicle.

5. The homing system according to claim 4, further comprising:

another, forward, extension, mounted on the forward part of the missile;

another test TC junction, a forward TC junction, mounted on the forward part of the forward extension, which will generally be the first TC junction to intercept the wake of a target vehicle; and amplitude-discriminating circuitry connected to the forward test TC junction, which is capable of determining whether or not the heat detected by the forward TC junction is increasing with time, thereby verifying that the missile is advancing toward the source of heat.

6. The homing system according to claim 5, further comprising:

alarm circuitry, connected to the output of the forward test TC junction, for generating an electrical signal when the forward test junction has intercepted the wake of a target vessel;

an electro-acoustic transducer, connected to the alarm circuitry, for generating an acoustic signal under the surface of the ocean which may be picked up by the launching vessel.

7. The homing system according to claim 5, wherein the heat sink means comprises electronic circuitry, including a feedback loop from the output of the TC voltage amplifier to the reference junction; and further comprising:

a feedback loop from the output of the servo motor back to the servo amplifier.

8. The homing system according to claim 7, further comprising:

another, second, pair of extensions mounted on the missile at right angles to the first-named pair of extensions;

a second pair of test TC junctions, one test TC junction mounted at the end of each extension, a pair of TC conductors extending from each test TC junction;

a second heat sink means connected to the free ends of the second pair of TC conductors;

a second pair of voltage amplifiers, the input of each amplifier being connected to a pair of conductors connected to a reference junction;

a summing amplifier, whose inputs are the output voltages from the second pair of voltage amplifiers;

a second flip-flop, whose input is the output voltage from the second summing amplifier;

a second servo amplifier whose input is connected to the output of the second flip-flop;

a second servo motor, whose input is the output of the second flip-flop, and whose output is adapted for connection to a tilting device; and, wherein the tilting device is in the form of an elevator, capable of causing the missile to climb or dive, as desired;

the second-named elements serving the same functions as the first-named corresponding elements.

9. The homing system according to claim 8, further comprising:

a depth transducer, mounted on the missile, for monitoring the depth at which the missile is operating;

a telemetry system, connected to the depth transducer, for telemetering to the missile-launching vessel the depth at which the missile is operating.

* * * * *